United States Patent [19]

De Haan et al.

[11] Patent Number: 5,072,293
[45] Date of Patent: Dec. 10, 1991

[54] METHOD OF ESTIMATING MOTIION IN A PICTURE SIGNAL

[75] Inventors: Gerard De Haan; Hendrik Huijgen, both of Eindhoven, Netherlands

[73] Assignee: U.S. Philips Corporation, New York, N.Y.

[21] Appl. No.: 567,414

[22] Filed: Aug. 14, 1990

[30] Foreign Application Priority Data

Aug. 29, 1989 [NL] Netherlands ............. 8902178
Aug. 29, 1989 [NL] Netherlands ............. 8902179

[51] Int. Cl.$^5$ ............................................. H04N 7/18
[52] U.S. Cl. ................................................. 358/105
[58] Field of Search ............ 358/105, 140, 133, 138; 341/106

[56] References Cited

U.S. PATENT DOCUMENTS 4,853,775  8/1989  Rouvrais et al. ............ 358/105
4,901,145  2/1990  Harradine et al. .......... 358/105
4,922,508  5/1990  Moriya ........................ 358/133
4,965,666 10/1990  Haghiri ....................... 358/105

Primary Examiner—Victor R. Kostak
Attorney, Agent, or Firm—Michael E. Marion

[57] ABSTRACT

In a method of estimating motion per picture portion in an image of a picture signal, wherein, starting from a first (x0=x1, y0=y2) and a second (x0=x3, y0=y4) starting vector a motion vector is determined, a first and a second candidate motion vector, respectively, are determined on the basis of the first and second starting vector in accordance with a predetermined criterion, a motion vector is selected from both candidate motion vectors, and as components of the starting vectors, respective corresponding components of candidate motion vectors (x1, y1), (x2, y2), (x3, y3) and (x4, y4) already previously determined are taken, which candidate motion vectors correspond respectively to the starting vectors.

20 Claims, 2 Drawing Sheets

METHOD OF ESTIMATING MOTIION IN A PICTURE SIGNAL

BACKGROUND OF THE INVENTION

The invention relates to a method of estimating motion of a picture portion in an image of a picture signal, comprising determining a number of candidate motion vectors starting from a corresponding number of starting vectors, and selecting a motion vector out of the determined candidate motion vectors.

Such a method is described in U.S. Pat. No. 4,853,775. Therein four starting vectors give rise to four candidate motion vectors, and only that motion vector is selected, out of these four candidate motion vectors, which gives a convergence of the used gradient algorithm with the smallest frame difference. The four starting vectors correspond to motion vectors already estimated for four neighboring pixels in the causal neighborhood of the present pixel.

SUMMARY OF THE INVENTION

The invention has inter alia for its object to provide an improved motion estimation.

A method of the type defined in the opening paragraph is therefore characterized by taking as components of the starting vectors, components of candidate vectors already previously determined, which candidate motion vectors correspond respectively to the starting vectors, and which candidate motion vector components correspond respectively to the starting vector components.

Unless explicitly stated differently in this description, a picture portion may consist of a single picture element or of a group (for example a block) of picture elements.

Because according to the invention, instead of the components of an ultimately selected motion vector of a neighboring picture portion, respectively corresponding components of at least one candidate motion vector determined for that neighboring picture portion are taken as components of each starting vector, which candidate motion vectors correspond respectively to the starting vectors, the advantage is obtained that a convergence direction associated with each starting vector component, for example from top to bottom or from left to right in the picture, is fully calculated, even if a candidate motion vector used for composing a starting vector did not lead to the best results for its own picture portion. However, it has been found that the motion vectors thus obtained are better than the motion vectors based on starting vectors which were the ultimately selected, best motion vector of a neighboring picture portion. A candidate motion vector which corresponds to a starting vector and is already previously determined for, for example, a left-hand adjacent picture portion, is to be understood to be that candidate motion vector that is based on a starting vector which, in its turn, is a candidate motion vector of a left-hand adjacent picture portion of said left-hand adjacent picture portion.

An embodiment of the motion estimating method according to the invention is characterized in that picture elements of each picture portion are divided into a first and a second respective group by sub-sampling the picture portion in a first and a second phase, a first candidate motion vector being determined for the first group and a second candidate motion vector being determined for the second group. It is not necessary to use twice the number of circuit elements for the realisation of the dual motion estimation, compared to a single motion estimation, because only half the number of picture elements are left for each group because of this sub-sampling operation, more specifically a different half for each phase. Therefore, in this embodiment each picture portion comprises at least two picture elements.

A further embodiment of the method according to the invention is characterized in that a first component of a first starting vector is taken to be equal to a first component of a first candidate motion vector already previously determined for a first picture portion, a second component of said first starting vector is taken to be equal to a second component of a second candidate motion vector already previously determined for a second picture portion, while the first and second picture portions do not coincide, and in that a first component of a second starting vector is taken to be equal to a first component of a third candidate motion vector already determined for a third picture portion, a second component of said second starting vector is taken to be equal to a second component of a fourth candidate motion vector already determined for a fourth picture portion, while the third and fourth picture portions do not coincide. Thus, the starting vectors are syntheses of components of two different candidate motion vectors already determined, and the risk that on passing beyond a contour in the picture, both components of the starting vectors belong to a different object than the object the present picture part belongs to, becomes smaller so that a quicker convergence to a correct (candidate) motion vector may be achieved. The first picture portion may, for example, be located opposite the third picture portion in relation to the picture portion for which the motion is being estimated and the second picture portion may be opposite the fourth picture portion in relation to the picture portion for which the motion is being estimated, so that an optimal independence between the two estimation results is obtained.

An embodiment thereof is characterized in that the third and fourth picture portions coincide with the second and first picture portions, respectively. In the example mentioned in the foregoing, in which the first picture portion was opposite the third portion, and the second picture portion opposite the fourth portion, two picture portions are to the right of or lower in the picture than the picture portion for which the motion was being estimated. Because motion vectors must already be available for these two picture portions, a motion estimation must also be carried out from the bottom to the top in the picture or motion vectors determined for a previous picture should be used. For the realization of this motion estimation, either the picture elements of the picture or the motion vectors must be stored in a memory, so that an additional memory is required. This additional memory is not required in the present embodiment, since, if there are only two picture portions the estimated motion vector of which is used as a starting vector for a new estimation, these picture portions can be placed such in relation to the picture portion for which the motion is being estimated, that only a motion estimation from top to bottom in the picture is necessary.

A still further elaboration of this embodiment, is characterized in that the first and second picture portions have a smaller y-coordinate than the picture portion for which the motion is being estimated, the first picture having a smaller x-coordinate and the second picture portion having a larger x-coordinate than the picture portion for which the motion is being estimated. The x-coordinate increases from left to right, and the y-coordinate increases from top to bottom. Thus, compared with a possible embodiment in which the first picture portion is directly to the left of the picture portion for which the motion is being estimated, the advantage is obtained that a larger time interval now becomes available between the moment at which the first candidate motion vector can be defined and the moment at which this estimation result is needed again to obtain the starting vectors belonging to the present picture portion for which the motion is being estimated.

A different embodiment according to the invention is characterized in that the picture portions of a picture for each row of picture portions are shiftedly stacked blocks of picture elements. This appeared to be a very suitable choice especially in connection with the still further elaboration described in the foregoing.

According to, for example, the "One step at a Time Search" (OTS) criterion, disclosed in IEEE Transactions on Communications, No. 8, 1985, pages 888–896, the estimated motion vector may be equal to the starting vector. An embodiment of the method according to the invention is characterized in that the candidate motion vectors are determined in accordance with a criterion that provides that only a candidate motion vector which differs from the starting vector can be determined. Because of this, the algorithm is prevented from remaining in a local minimum.

A still further embodiment of the method according to the invention, is characterized in that components of the estimated motion vectors are spatially low-pass filtered. This provides a vector field without abrupt transients, which inspite of an inaccuracy caused by the low-pass filtering, appeared to lead to a finer result, because block-shaped errors in a picture interpolated by means of the vectors obtained occur less frequently. Because of the averageing effect of the low-pass filtration, a sub-pixel accuracy may even be obtained. Sub-pixel accuracy must be understood to mean an accuracy which is finer than the distance between subsequent picture elements.

An elaboration thereof is characterized in that said low-pass filtering step includes the steps of recursively filtering said selected vector components to obtain output components;

comparing said output components to said selected vector components to obtain a control signal indicating whether said selected vector components differ more than a given threshold from said output vector components; and disabling said recursively filtering step if said control signal indicates that said selected vector components differ more than said given threshold from said output vector components. Due to the disabling of the postfiltering operation when the difference between a newly estimated vector and a filtered output vector becomes larger than a given threshold, it is avoided that vectors belonging to different objects in the scene and moving in different directions are averaged.

A more specific embodiment thereof is characterized in that the low-pass-filtered vector components are submitted to a spatial sub-sampling operation which provides a saving in data, so that the method according to the invention can, for example, be used in an encoding section of a transmission or storage system, whereby in a corresponding decoding section a motion-compensated interpolation by means of transmitted vector information is performed.

A further embodiment of the method according to the invention is characterized in that previous to the motion estimation, the picture signal is temporally low-pass filtered by means of a temporal filter with coefficients ($\frac{1}{4}$, $\frac{1}{2}$, $\frac{1}{4}$), wherein from field to field lines from both neighbouring fields located alternately above or below a line in a present field are multiplied by the coefficient $\frac{1}{4}$. Thus, the advantage is obtained that high vertical frequencies in a picture which might cause large differences between subsequent fields in the picture, which are not caused by movement, are filtered out, so that a better motion estimation is obtained. In practice the filter used appears to provide good results.

Another embodiment of the method according to the invention is characterized in that said candidate motion vector determining step includes the steps of:

taking the median of said picture signal, a field-delayed picture signal and a field- and line-delayed picture signal to obtain a filtered signal; and estimating said candidate motion vectors based on said picture signal and said filtered signal. Due to this median prefilter, a kind of quasi progressive scan signal is applied to the proper estimator, so that estimation errors caused by interlace are avoided.

According to another aspect of the invention, there is provided a method of estimating motion per picture portion in an image of a picture signal wherein, starting from a starting vector, a motion vector is determined according to a previously defined criterion, characterized in that a first component of the starting vector is taken to be equal to a first component of a first already previously estimated motion vector, belonging to a first picture portion, and a second component of the starting vector is taken to be equal to a second component of a second, already previously estimated motion vector, belonging to a second picture portion, said first and second picture portions not coinciding. This aspect of the present invention is based on the recognition that no optimum estimation result will be obtained, when during the estimation of a motion vector for a picture portion on one side of a contour a starting vector estimated for a picture portion on the other side of the contour and which therefore probably belongs to a different object, is used as the starting point. The measure according to this aspect of the invention, which provides that the starting vector is a synthesis of components of two different already previously estimated vectors, reduces the risk that during passing beyond a contour in the picture both components of the starting vector belong to the other object, so that a faster convergence to a correct motion vector can be obtained.

An embodiment of this aspect of the invention is characterized in that for each picture portion not only said motion estimation, but also a second motion estimation is effected, in which for the second motion estimation components of a second starting vector are assumed to be equal to corresponding components of third and fourth, already previously estimated motion vectors, respectively, which belong to third and fourth non-coinciding picture portions, respectively, and a second motion vector is determined starting from the second starting vector according to said criterion, whereafter from said first and second determined motion vectors, a best motion vector is selected. This provides the advantage that the estimation result depends to a less extent on structures (contours) present in the picture because the best motion vector, i.e. the motion vector which results in the smallest estimation error, is selected from two separately defined candidate motion vectors, which were obtained by means of different starting vectors. In this situation, in relation to the picture portion for which the motion is being estimated, the first picture portion may be opposite to the third picture portion and the second picture portion may be opposite the fourth picture portion, whereby an optimal independence between both estimation results is obtained. It should be noted that it is known per se from L. Looijenga's graduation report, "Methodes voor bewegingscompensatie in een sequentie van beelden", TU Delft, 1986, pp. 27-28, to select a starting vector from two candidate starting vectors by comparing which of these, as a motion vector, results in the smallest estimation error, to determine subsequently a motion vector, starting from the selected starting vector according to the previously defined criterion.

These and other (more detailed) aspects of the invention will now be described and elucidated in greater detail with reference to the following non-limitative examples and drawings.

DETAILED DESCRIPTION OF PREFERRED EMBODIMENTS OF THE INVENTION

Figure 1:
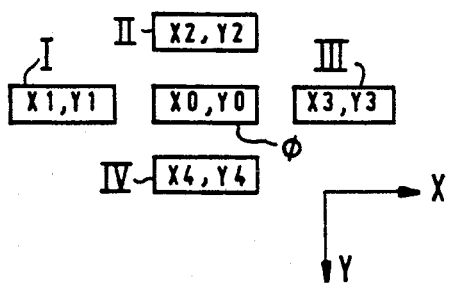
FIG. 1 shows a first possible configuration of picture portions with associated vector components.

FIG. 1 shows a first possible configuration of picture portions with associated vector components. In the lower right-hand corner of FIG. 1, it is shown how the x- and y-coordinates are defined in the description and in the claims. The x-coordinate increases therein from left to right, and the y-coordinate from top to bottom. In the middle of FIG. 1, a picture portion is indicated for which a motion vector is to be selected from two candidate motion vectors, which must be defined starting from two starting vectors (x0, y0) according to some previously defined criterion. The starting vectors are composed of the components of candidate motion vectors already determined for other picture portions; for each starting vector at least one corresponding candidate motion vector is used. It is to be noted that candidate motion vectors determined by estimations for neighboring picture portions are used to compose the starting vectors for the estimation of the current picture portion $\phi$; it is irrelevant whether the candidate motion vectors used are finally selected motion vectors. A candidate motion vector which corresponds to a starting vector and is already previously determined for, for example, a picture portion adjacent to the left, must be understood to mean that candidate motion vector that is based on a starting vector which, in its turn, is a candidate motion vector of a picture portion adjacent to the left thereof. Consequently a convergence direction belonging to each starting vector, for example, from top to bottom or from left to right in the picture, is fully calculated, even if a candidate motion vector thus obtained does not provide the best results. However, it was found that motion vectors thus obtained are better than motion vectors based on starting vectors which were the ultimately selected, best motion vectors of a previous picture portion. It is thus necessary for each picture portion to have both starting vectors lead to a candidate motion vector, in order to be able to start from candidate motion vectors.

A picture portion may be either a single picture element or a group (block) of picture elements. The previously defined criterion may be, for example, the "One step at a Time Search" (OTS) criterion mentioned in IEEE Transactions on Communications, No. 8, 1985, pages 888–896, or the "Gradient Adaptive Search" criterion mentioned in the $5^{th}$ Intern. Conf. on Digital Processing of Signals in Communications, Loughborough, 20-23 September 1988, publication No. 82, Institution of Electronic and Radio Engineers, page 109-115. The OTS criterion implies that a shift with the smallest possible associated estimation error is first looked for in the horizontal or x-direction, starting from the starting vector, and subsequently, starting from this shift, a shift with the smallest possible associated estimation error in the vertical or y-direction is looked for.

The previously defined criterion may be a criterion in which the starting vector itself is a possible estimation result, or a criterion in which the starting vector itself may not be an estimation result. If the starting vector itself cannot be an estimation result, less circuit elements are required for a criterion which compares estimation errors of a plurality of candidate motion vectors, because the estimation error occurring when using the starting vector now need not to be defined and compared. Furthermore, a criterion in which the starting vector itself is excluded, prevents the algorithm from getting stuck in a local minimum. By using such a criterion, the motion estimation will result to a lesser extent in a similar estimation result for subsequent picture portions, which however is no problem because a spatial low-pass filtering of the vector components may remove oscillations caused by the criterion around a correct vector value.

When larger block sizes are used, a criterion which selects the vector having the smallest error on the axis having the largest fault gradient, was found to furnish good results. A criterion according to which four vectors $(a\pm k, b)$ and $(a, b\pm k)$, with $\pm k$ picture element variations in either the horizontal or the vertical direction relative to a starting vector $(a, b)$ are compared in order to determine which vector provides the best match, also provides good results and, moreover, is easier to realise. In general it holds that the convergence rate may increase with increasing values for k but may sooner result in instabilities. In practice it appears that an optimum value for k equalled 1 when a picture portion size of $1\times2$ picture elements is used, and that the optimum value for k equalled 2 when a picture portion size of 4×8 is used. It is alternatively possible to have the value k depend on the value of the estimation error, such that for a relatively large error a higher value for k is being taken, so that a different and, as is to be hoped, better vector may be found faster, while for a relatively small error a small value for k is sufficient, as the vector is apparently already fairly correct. Furthermore, it is possible to compare eight vectors obtained by means of values for k equal to 1 and 3, in one operation.

In FIG. 1, first I and second II picture portions, respectively, are shown to the left of and above the central picture portion $\phi$, for which a first candidate motion vector (x1, y1) originating from the left and a second candidate motion vector (x2, y2) originating from above, respectively, have already been determined. In a very straightforward implementation, the candidate motion vector (x1, y1) could be taken as a first starting vector of the central picture portion $\phi$, and the candidate motion vector (x2, y2) could be taken as a second starting vector of the central picture portion $\phi$. However, it is preferred that during determining the first candidate motion vector of the central picture portion $\phi$, a first starting vector is taken, the components of which originate from two already previously determined candidate motion vectors, for example (x0=x1, y0=y2). The second starting vector may be the vector (x0=x3, y0=y4), wherein the components x3 and y4 originate from a third candidate motion vector (x3, y3) already determined, and a fourth candidate motion vector (x4, y4) already determined, respectively, which belong to respective third III and fourth IV picture portions. Compared to the central picture portion $\phi$ for which the motion is being estimated, the third III and fourth IV picture portions are located opposite the first picture portion I and the second picture portion II, respectively, so that an optimum independence between the two candidate motion vectors to be determined is obtained. As each starting vector is a synthesis of components of two candidate motion vectors already determined and belonging to two different picture portions, the risk is smaller that during passing through a contour in the picture, both components of the starting vector belong to a different object than to which the present picture portion belongs, so that a faster convergence to a correct motion vector can be obtained. Each motion vector has its own convergence direction, in the example given the first starting vector component converges in the x-direction and the second starting vector component converges in the y-direction. Starting from each of these starting vectors, a candidate motion vectors is determined according to some previously defined criterion which starts from the corresponding starting vector.

It is to be noted that the recognition that a starting vector of a motion estimation method preferably is composed of components derived from two motion vectors already estimated for two non-coinciding adjacent picture portions, is generally applicable and not limited to use in combination with the recognition that a starting vector preferably is composed of components derived from at least one candidate motion vector instead of from at least one finally selected motion vector.

Figure 2:
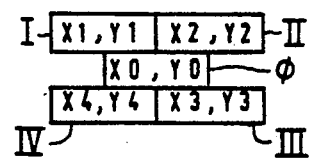
FIG. 2 shows a second possible configuration of picture portions with associated vector components.

A second possible configuration of continuous picture portions with accompanying vector components is shown in FIG. 2. This configuration, in which the first picture portion I is located obliquely above the picture portion $\phi$ for which the motion must be estimated, has the advantage, that compared with the configuration shown in FIG. 1 in which the first picture portion I was located on the same line or lines as the picture portion $\phi$ for which the motion must be estimated, there is a larger time interval between the instant at which the candidate motion vector (x1, y1) is determined and the instant at which this candidate motion vector is required for the composition of the starting vector (x0, y0). The starting vector may be compounded in the same manner as described in relation to FIG. 1. The starting vector may also be the vector (x0=x1, y0=y2) for determining the first candidate motion vector and (x0=x2, y0=y1) for determining the second candidate motion vector. This has the advantage that it is only necessary to proceed from the left upper corner of the picture, and not also from the right lower corner or using previous field motion vectors, to have estimation results of the candidate motion vectors (x3, y3) and (x4, y4) available to obtain the second starting vector, while there are still two sufficiently independently defined starting vectors.

Another solution for the non-causality problem that arises if the candidate motion vectors of picture portions III and IV shown in FIGS. 1 or 2 are used, is to use the candidate motion vectors determined for these picture portions during the previous field period.

If desired, it is also possible to compare the candidate motion vectors determined by starting from 4 starting vectors which are the corresponding candidate motion vectors of all picture portions I-IV, while the candidate motion vectors of picture portions III and IV are again those determined during the previous field period. In another modification, each starting vector may be composed of the components of two candidate motion vectors already determined for the adjacent picture portions I-IV. Due to these modifications, a faster convergence of the algorithm can be obtained on passing beyond a contour in the picture, because estimation results from both sides of the contour are taken into account.

According to yet another modification, it is possible to select between an estimation based on previous field vectors and an estimation based on current field vectors. In this modification, the estimation based on previous field vectors may use the configuration of FIG. 1, in which the candidate motion vectors of all picture portions I-IV are used. The estimation based on current field vectors may use the configuration of FIG. 2, in which only the candidate motion vectors of picture portions I and II are used. The selection between the estimation based on previous field vectors and the estimation based on current field vectors is preferably based on stored estimation errors which resulted when the candidate motion vectors (x1, y1) were applied to their own picture portions I of FIG. 1 and of FIG. 2, respectively. As the selection is an a priori selection, i.e. based on data which are known before either of the estimations is actually performed, it is not necessary to perform the non-selected estimation. It is of course also possible to base the selection on a comparison of the results obtained by the estimation based on previous field vectors and the estimation based on current field vectors, i.e. an a posteriori selection, but then more processing equipment is required. The estimation based on previous field vectors can be simplified if among the previous field vectors, only the candidate motion vector determined for the picture portion IV of FIG. 1 is taken into account, so that altogether picture portions I and II of FIG. 2 and picture portion IV of FIG. 1 are used.

Figure 3:
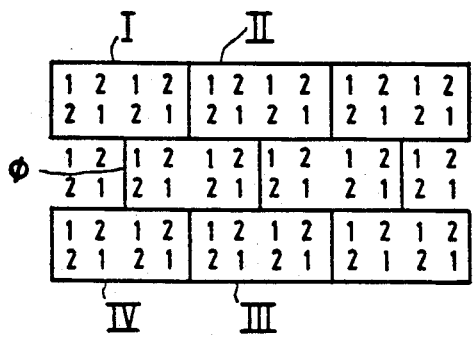
FIG. 3 shows a configuration sampled in a first and a second phase, of shiftedly stacked blocks of picture elements.

A configuration of shiftedly stacked blocks of two-by-four picture elements, sampled in a first and a second phase is shown in FIG. 3. The samples resulting from the sampling operation in the first phase are indicated in FIG. 3 by a "1", and the samples resulting from the sampling operation in the second phase are indicated in FIG. 3 by a "2". As only half the original number of picture elements remains for each phase in this sampling operation, it becomes possible to carry out the dual motion estimation with different starting vectors according to the invention, without it being necessary to use twice the number of circuit elements. Herein, use is made of starting vectors which are composed of vector components of candidate motion vectors already determined, belonging to blocks which are indicated by I and II in the method illustrated in FIG. 2 for the estimation of the motion of a block denoted by $\phi$. For example, the starting vector (x0=x1, y0=y2) is used for the first phase, and the starting vector (x0=x2, y0=y1) is used for the second phase. It is also possible to use the starting vector (x0=x3, y0=y4) for the second phase, in which use is made of vector components of motion vectors already estimated, belonging to blocks that are indicated by III and IV. Obviously, any sampling method other than the method shown in the drawing can also be used; for example, it is not necessary to sample from line to line in anti-phase.

Figure 4:
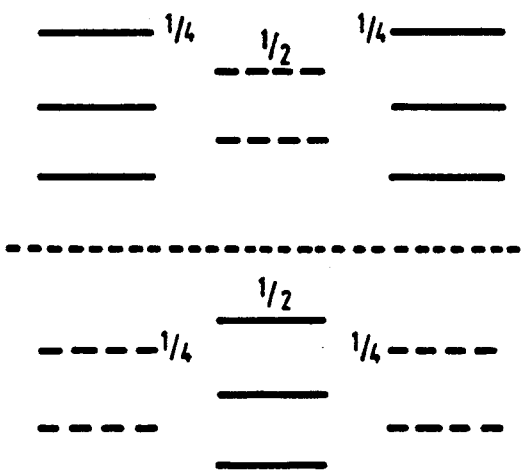
FIG. 4 shows the mode of operation of a temporal prefilter with reference to a sketch of subsequent rasters assembled from lines.

The picture signal may be temporally low-pass filtered previous to the motion estimation. This has the advantage that high vertical frequencies in a picture, due to which large differences between subsequent fields of the picture occur that are not caused by motion, are being filtered out so that a better estimation result is obtained. The mode of operation of a preferred embodiment of the temporal prefilter is shown schematically in FIG. 4. FIG. 4 consists of two halves, separated by a dotted line, each showing schematically a number of lines from three subsequent fields of which the intermediate field is the present field to be filtered. The filter operates with coefficients ($\frac{1}{4}$, $\frac{1}{2}$, $\frac{1}{4}$), wherein, from field to field, lines from both neighbouring fields, lying alternately above or below a line of a present field, are being multiplied by the coefficient $\frac{1}{4}$. In practice this filter appears to lead to good results.

The picture signal may be spatially low-pass filtered, previous to the motion estimation, to reduce influences of noise. The picture signal may also be spatially sub-sampled, which allows for a field memory to have only half the capacity needed otherwise.

If components of the selected vectors are spatially low-pass filtered, a vector field without abrupt transients is obtained which, inspite of the inaccuracy caused thereby, appeared to provide a finer result, because errors in the form of blocks occur less often in a picture having been interpolated using the obtained vectors. Through the averageing effect of the low-pass filtering, even a sub-pixel accuracy may be obtained, i.e. an accuracy which is finer than the distance between two subsequent picture elements. The low-pass filtration of the estimated motion vector components furthermore provides the advantage that low-pass filtered vector components can be spatially sub-sampled, without fold-back effects being produced. The sub-sampling operation provides a saving in data, so that the method according to the invention can make use of a small picture portion size, which has the advantage that object boundaries may be followed appropriately, but has the disadvantage that the number of resultant vectors is large, while the method may still be applied in an encoding portion of a picture signal transmission or storage system, having only a limited capacity for the transmission of motion information for effecting a motion-compensated interpolation by means of the transmitted vector information, in a corresponding decoding section. With an interpolation of the picture signal by means of vector components, recovered through interpolation from the transmitted vector information, per small picture portions, block errors caused by block boundaries of large blocks, not coinciding with object boundaries are decreased, while, because of the sub-sampling operation of the vector components, no more vector information is being transmitted than would be transmitted if the motion would be estimated for larger blocks.

Figure 5:
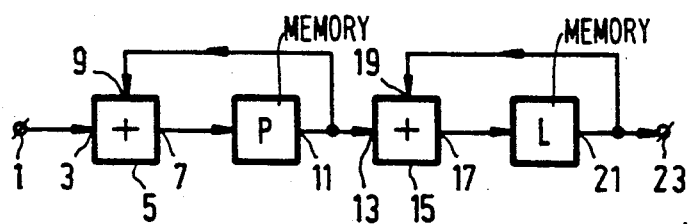
FIG. 5 shows a possible structure of a spatial prefilter or postfilter.

A possible structure of a suitable spatial low-pass filter for the filtering operation, previous to the motion estimation, of the picture signal and/or for filtering of the estimated vector components, is shown in FIG. 5. An input 1 of the filter is connected to a first input 3 of an adder 5, of which an output 7 is connected to a second input 9 of the adder 5 via a memory P with a delay of a picture element period. An output 11 of the memory P is connected to a first input 13 of an adder 15, of which an output 17 is connected to a second input 19 of the adder 15 via a memory L with a delay of a line period. An output 21 of the memory L is connected to an output 23 of the spatial filter.

Figure 6:
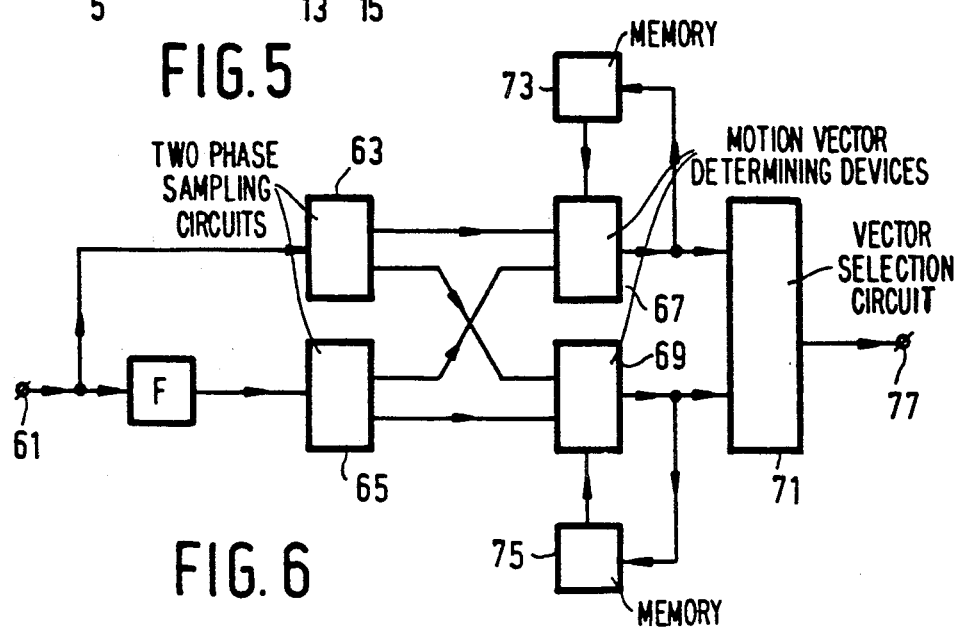
FIG. 6 shows an embodiment of a motion estimator according to the invention.

An embodiment of a motion estimator according to the invention is shown in FIG. 6. An input 61 of the motion estimator is connected to a first two-phase sampling circuit 63, and to a second two-phase sampling circuit 69 via a field memory F. Each of these two-phase sampling circuits 63 and 65 is connected to a first-phase candidate motion vector determining device 67 and a second-phase candidate motion vector determining device 69. The first-phase determining device 67 estimates the motion for the samples indicated by a "1" in FIG. 3, and the second-phase determining device 69 estimates the motion for the samples indicated by a "2" in FIG. 3. The candidate motion vector determining devices 67 and 69 are connected to a best vector selection circuit 71 and to themselves, via vector component memories 73, 75, respectively, for the storage of new starting vector components. As is described in the foregoing, for the first-phase motion estimation a different starting vector is used than for the second phase motion estimation. The best vector selection circuit applies to an output 77 of the motion estimator the best vector from the candidate motion vectors estimated by candidate motion vector determining devices 67 and 69. As can be seen from FIG. 6, inputs of the vector component memories 73 and 75 are connected to outputs of the respective candidate motion vector determining devices 67, 69. This configuration according to the invention, in which, starting from each starting vector, a separate candidate motion vector is determined and a motion vector is selected from both candidate motion vectors, and in which, as components of the starting vectors, the corresponding components, respectively, of the candidate motion vectors already determined and which respectively correspond to the starting vectors, are taken, appeared to furnish better results than a prior art like configuration in which the inputs of the vector component memories 73 and 75 are connected to the output 77 of the best vector selection circuit 71, in which consequently, as components of the starting vector, respectively corresponding components of the selected best motion vector are taken. A candidate motion vector which corresponds to a starting vector and is already determined for, for example, a left-hand adjacent picture portion, should be understood to mean that candidate motion vector that is based on a starting vector which itself is a candidate motion vector of a picture portion immediately to the left of said left-hand adjacent picture portion.

To implement the modification described hereinbefore which used both an estimation based on previous field vectors and an estimation based on current field vectors, each vector component memory (73 or 75) should comprise a first memory storing the candidate motion vectors from the current field, a second memory storing the candidate motion vectors from the previous field, and a switch for selectively coupling the output of the first memory or the output of the second memory to the candidate motion vector determining device (67 or 69, respectively). This switch is controlled by stored estimation errors as described hereinbefore.

Figure 7:
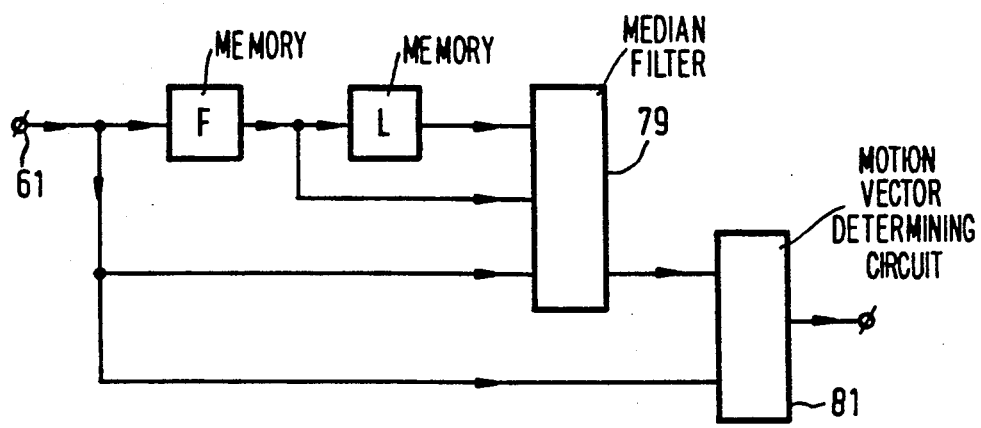
FIG. 7 shows part of another embodiment of a motion estimator according to the invention, in which a median prefilter is placed before a candidate motion vector determining circuit.

As has been explained in the foregoing, the picture signal may be applied to the motion estimator via spatial and/or temporal low-pass filters (see FIG. 7). If there is both spatial and temporal filtering, the sequence spatial filtering first, followed by temporal filtering has the advantage that the memory required for the temporal filtering can be smaller. Furthermore, the output 77 of the motion estimator can be connected to a spatial low-pass filter (see FIG. 8) and optionally to a sampling circuit.

FIG. 7 shows part of another embodiment of a motion estimator according to the invention, in which a median prefilter is placed before a candidate motion vector determining circuit. This median prefilter can be considered as an alternative to the prefilter of FIG. 4. In FIG. 7 the input 61 is coupled directly, through the field memory F, and through the series arrangement of the field memory F and a line memory L, to respective inputs of a median filter 79. Median filters as such are known in the art, see U.S. Pat. No. 4,740,842 (PHN 11,613). An output of the median filter 79 and the input 61 are coupled to respective inputs of a candidate motion vector determining circuit 81, which may comprise the combination of the candidate motion vector determining device 69 and the vector component memory 75 as shown in FIG. 6. Due to this prefilter, a kind of quasi-progressive scan signal is applied to the candidate motion vector determining circuit, so that estimation errors caused by interlace are mitigated.

Figure 8:
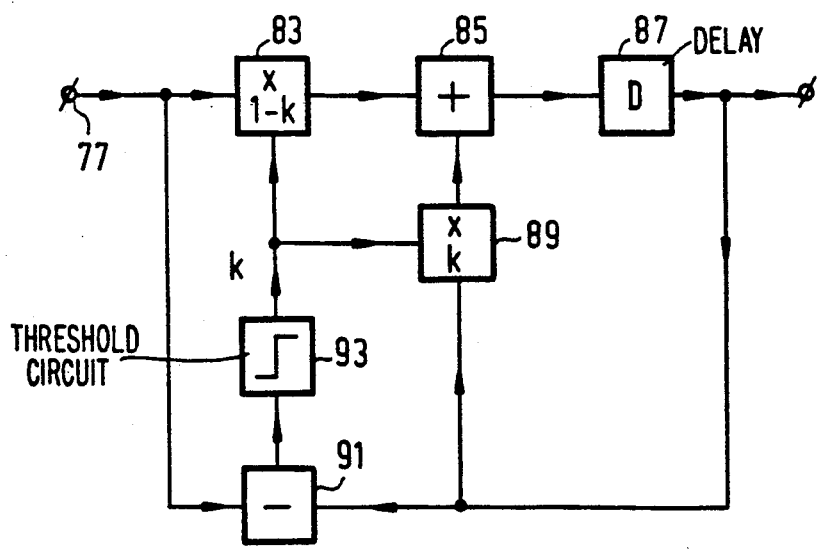
FIG. 8 shows a spatial postfilter for the estimated motion vectors.

FIG. 8 shows a spatial postfilter for the estimated motion vectors. The output 77 of the motion estimator (see FIG. 6) is coupled to a weighted averaging circuit comprising a first multiplier 83, an adder 85, a delay 87, and a second multiplier 89 coupling the output of the delay 87 to a second input of the adder 85. The output of the postfilter is formed by the output of the delay 87, but may alternatively be formed by the output of the adder 85. Multiplier 83 multiplies by a factor 1-k, and multiplier 89 multiplies by a factor k. According to a preferred embodiment, both multipliers are controlled by a non-linear device including a subtractor 91 and a threshold circuit 93. The subtractor compares a newly estimated motion vector to the filter output, and if the difference between these two vectors is larger than a given amount, threshold circuit 93 sets the multiplying factor k, which normally will be ½, to zero thus effectively disabling the filtering operation so that the newly estimated vector is outputted unfiltered. This switching action is based on the recognition that if the difference between a newly estimated vector and the filter output (or alternatively, a previously estimated vector) becomes too large, the newly estimated vector will probably belong to a different object in the scene moving in another direction, or, stated in another way, the best vector selection circuit 71 is switching between two different convergence directions. In that case, averaging of motion vectors will only result in garbage, so that the filtering action would better be disabled.

It is to be noted that while in the above description several modifications and extensions have been described in combination with the invention as claimed, each of these modifications and extensions might also be used in combination with other motion estimators. For example, the described pre- and postfilters can be used with other motion estimators as well. The applicants hereby give notice that new claims may be formulated to such features and/or combinations of features during the prosecution of the present application or of any further application derived therefrom.

We claim:

1. A method of estimating motion of at least one picture portion in an image of a picture signal, comprising the steps of: determining a number of candidate motion vectors starting from a corresponding number of starting vectors, and selecting a motion vector out of the determined candidate motion vectors, characterized by taking as components of the starting vectors, components of candidate motion vectors already previously determined, which candidate motion vectors correspond respectively to the starting vectors, and which candidate motion vector components correspond respectively to the starting vector components.

2. A method as claimed in claim 1, wherein picture elements of each of a plurality of picture portions are divided into a first and a second group, respectively, by sub-sampling the picture portion in a first and a second phase, a first candidate motion vector being determined for the first group and a second candidate motion vector being determined for the second group.

3. A method as claimed in claim 1, wherein a first component of a first starting vector is taken to be equal to a first component of a first candidate motion vector already previously determined for a first picture portion, a second component of said first starting vector is taken to be equal to a second component of a second candidate motion vector already previously determined for a second picture portion, while the first and second picture portions do not coincide, and in that a first component of a second starting vector is taken to be equal to a first component of a third candidate motion vector already determined for a third picture portion, a second component of said second starting vector is taken to be equal to a second component of a fourth candidate motion vector already determined for a fourth picture portion, while the third and fourth picture portions do not coincide.

4. A method as claimed in claim 3, wherein the third and the fourth picture portions coincide with the second and first picture portions, respectively.

5. A method as claimed in claim 3 wherein the first and the second picture portions have a smaller y-coordinate than the picture portion for which the motion is being estimated, the first picture portion having a smaller x-coordinate and the second picture portion a larger x-coordinate than the picture portion for which the motion is being estimated.

6. A method as claimed in claim 2, wherein the picture portions in a picture for each row of picture portions are picture element blocks which are shiftedly stacked.

7. A method as claimed in claim 1, wherein the candidate motion vectors are determined in accordance with a criterion that provides that only a candidate motion vector which differs from the starting vector can be determined.

8. A method as claimed in claim 1, wherein components of the selected vectors are spatially low-pass filtered.

9. A method as claimed in claim 8, wherein said low-pass filtering step includes the steps of
recursively filtering said selected vector components to obtain output components;
comparing said output components to said selected vector components to obtain a control signal indicating whether said selected vector components differ more than a given threshold from said output vector components; and
disabling said recursively filtering step if said control signal indicates that said selected vector components differ more than said given threshold from said output vector components.

10. A method as claimed in claim 8, wherein the low-pass filtered vector components are spatially sub-sampled.

11. A method as claimed in claim 1, wherein, previous to the motion estimation the picture signal is temporally low-pass filtered utilizing a temporal filter having coefficients ($\frac{1}{4}$, $\frac{1}{2}$, $\frac{1}{4}$), wherein from field to field, lines from both adjacent fields, located alternately above or below a line of a present field are multiplied by the coefficient $\frac{1}{4}$.

12. A method as claimed in claim 1, wherein said candidate motion vector determining step includes the steps of:
taking the median of said picture signal, a field-delayed picture signal and a field- and line-delayed picture signal to obtain a filtered signal; and
estimating said candidate motion vectors based on said picture signal and said filtered signal.

13. A method as claimed in claim 3, wherein the picture portions in a picture for each row of picture portions are picture element blocks which are shiftedly stacked.

14. A method as claimed in claim 4, wherein the picture portions in a picture for each row of picture portions are picture element blocks which are shiftedly stacked.

15. A method as claimed in claim 5, wherein the picture portions in a picture for each row of picture portions are picture element blocks which are shiftedly stacked.

16. A method as claimed in claim 15, wherein the candidate motion vectors are determined in accordance with a criterion that provides that only a candidate motion vector which differs from the starting vector can be determined.

17. A method as claimed in claim 16, wherein components of the selected vectors are spatially low-pass filtered.

18. A method as claimed in claim 10, wherein previous to the motion estimation the picture signal is temporally low-pass filtered utilizing a temporal filter having the coefficients $\frac{1}{4}$, $\frac{1}{2}$, $\frac{1}{4}$, wherein from field to field, lines from both adjacent fields, located alternately above or below a line of a present field are multiplied by the coefficient $\frac{1}{4}$.

19. A method of estimating motion per picture portion in an image of a picture signal wherein, starting from a starting vector, a motion vector is determined according to a previously defined criterion, characterized in that a first component of the starting vector is taken to be equal to a first component of a first already previously estimated motion vector, belonging to a first picture portion, and a second component of the starting vector is taken to be equal to a second component of a second, already previously estimated motion vector, belonging to a second picture portion, said first and second picture portions not coinciding.

20. A method as claimed in claim 19, wherein for each picture portion, in addition to said estimation, a second motion estimation is also performed, wherein for the second motion estimation components of a second starting vector are assumed to be equal to respective corresponding components of third and fourth, respectively, already previously estimated motion vectors associated with third and fourth, non-coinciding picture portions, respectively, and starting from the second starting vector a second motion vector is determined in accordance with the said criterion, whereafter a best motion vector is selected from said first and said second determined motion vectors.

* * * * *